Dec. 13, 1949 R. J. KUTZLER 2,491,380
CONTROL APPARATUS
Filed July 15, 1944
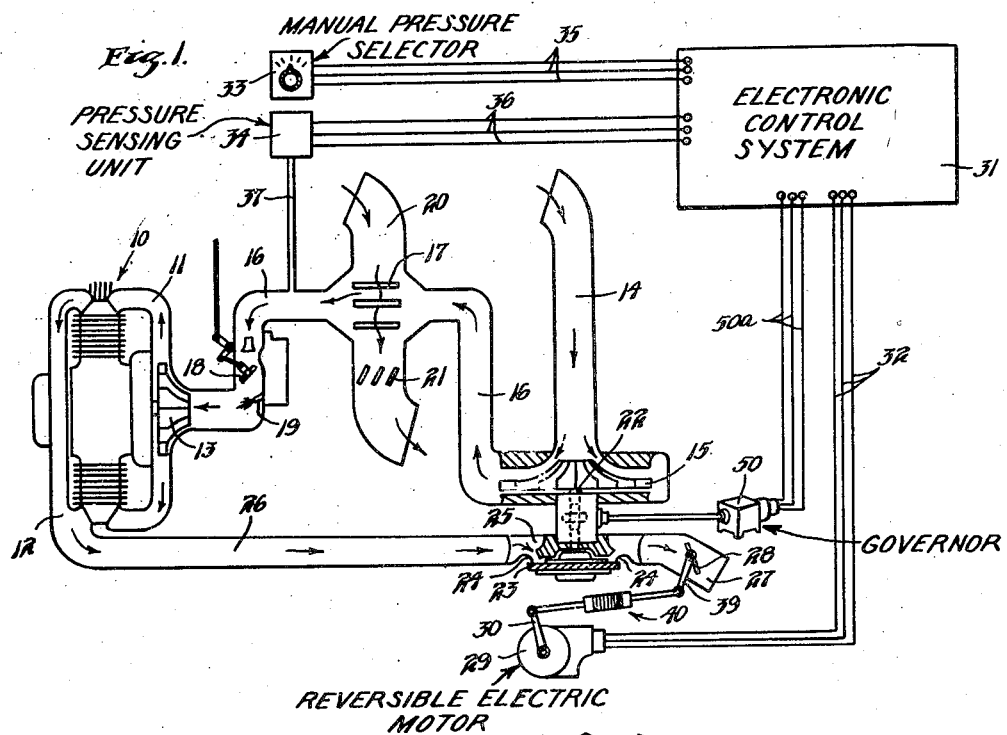
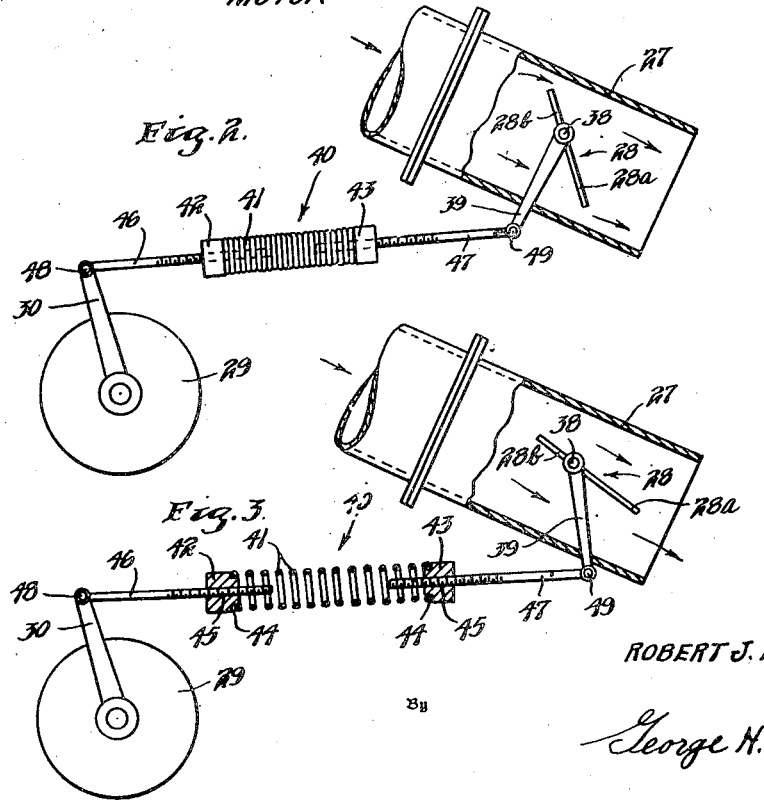
Inventor
ROBERT J. KUTZLER
By
George H. Fisher
Attorney Patented Dec. 13, 1949

2,491,380

UNITED STATES PATENT OFFICE 2,491,380

CONTROL APPARATUS

Robert J. Kutzler, Minneapolis, Minn., assignor to Minneapolis-Honeywell Regulator Company, Minneapolis, Minn., a corporation of Delaware Application July 15, 1944, Serial No. 545,070

3 Claims. (Cl. 230—5)

This invention relates generally to improvements in control apparatus for turbo-superchargers used in connection with aircraft and similar internal combustion engines, and more specifically to improvements in means for controlling the speed of the turbine used for driving such devices.

In the usual arrangement, the supercharging compressor, which supplies air under pressure for combustion to the engine, is powered by a turbine driven by exhaust gases from the engine, the two units being commonly termed a turbo-supercharger. To control the pressure of the air at the discharge side of the supercharger compressor, the speed of the turbine is adjusted by means of a valve, called a waste gate, located in the exhaust system and so arranged that, as it is closed, it diverts more and more of the total volume of exhaust gases through the turbine to increase the speed thereof, and as it is opened, permits a greater part of the gases to discharge without effect on the turbine to thus decrease its speed. To position the waste gate a motor is connected to the gate and the motor in turn is controlled by an electronic amplifier which responds to various controls to actuate the motor and modulate the waste gate position according to requirements. One of such controls is a manual selector by which any output pressure within range may be selected while another is a pressure sensing control by means of which variations in the pressure may be compensated for, by positioning of the waste gate, in order to maintain within close limits the selected pressure under widely varying conditions. It will be understood that, in conjunction with the throttle, this control of the pressure of the air supplied by the supercharger, controls or regulates the intake manifold pressure for a given engine speed and hence the power output of the engine.

Control systems of this nature are disclosed in detail in the co-pending application of Hubert T. Sparrow, Serial No. 476,797, filed February 22, 1943, now Patent No. 2,477,668 dated August 2, 1949, for Control apparatus, and attention is invited thereto for a complete discussion of all aspects of such systems.

One control hitherto necessary is a means for preventing overacceleration of the turbine in the effort to satisfy the call of the system for the higher values of intake manifold pressures; for example when the atmospheric pressure is very low as is the case in aircraft engines operated at high altitudes. Under such conditions, or during a take-off or rapid climb, the pilot may select a very high output pressure. Under some circumstances this causes a dangerous overacceleration of the turbine and compressor causing hunting or overshooting conditions in the control system, or closes the waste gate to such a degree as to build up excessive back pressures in the exhaust system, which reduces the efficiency of the engine. Acceleration control means of the kind previously used are effective but are themselves quite complicated in construction and add to the complexity of the control system as a whole.

It is the primary object of my invention, therefore, to provide simple and practical means for preventing overacceleration of the turbo-supercharger under all conditions and which means require no connection to or part in the electronic control system, to thus effect a general simplification of the controls.

Another object is to provide overacceleration and excess back pressure prevention means which is wholly embodied in the waste gate and its control element and linkage.

A further object is to provide means of this nature which is responsive primarily to exhaust gas pressures against the waste gate and thus instantaneously adjusts the waste gate in accordance with variations in such pressures.

Other objects and advantages of the present invention will become apparent from a consideration of the appended specification, claims and drawings.

In the drawings:

Figure 1 is a diagrammatic illustration of an internal combustion engine and turbo-supercharger and connecting and control elements thereof, my invention being shown as applied to the waste gate for the turbine.

Figure 2 is an enlarged longitudinal sectional view through the discharge duct for the turbine, showing the waste gate partially closed and with my present invention embodied in connection therewith.

Figure 3 is a view similar to Figure 2 but showing the waste gate opened in response to an increase in exhaust gas pressure.

Referring now more particularly and by reference characters to the drawing, I have shown in Figure 1 thereof an internal combustion engine, which may be the engine of an aircraft, and its induction and exhaust systems, with a turbo-supercharger and various controls, and all of these devices are shown diagrammatically but in proper connected relation. The engine 10 has an intake manifold 11 and exhaust manifold 12, and built into the former is a conventional direct driven compressor 13 which not only serves to build up the pressure of the gaseous mixture supplied for combustion in the engine, but serves to distribute such mixture equally to all cylinders.

The air for supporting combustion is taken from the atmosphere through an intake duct 14 into a centrifugal type compressor 15 and is delivered therefrom under pressure through a duct system, designated generally at 16, to the intake manifold 11. Prior to admission to said manifold 11, the air passes through an after cooler 17 which removes some of the heat of compression, and past a conventional throttle 18 and carburetor 19. Air is taken from the atmosphere into the after-cooler 17 through an intake duct 20 under control of shutters 21 and passes in heat exchanging relation to the air flowing from compressor 15. The throttle 18 controls the flow of air to the carburetor 19, while said carburetor mixes the fuel with the air in usual manner.

The rotor of the compressor 15 is driven by a shaft 22 from a turbine wheel 23 and this wheel is rotated by exhaust gases issuing from nozzles 24 provided around a nozzle box 25, to which the gases are conducted from the exhaust manifold 12 through an exhaust stack or duct 26. The nozzle box 25 has an outlet duct 27 leading to atmosphere and in this outlet duct 27 is located the waste gate 28 which controls the escape of the exhaust gases from the box.

It will be apparent that, as the waste gate 28 is moved toward a closed position, the exhaust gas pressure in nozzle box 25 builds up and the gases therefore issue from the nozzles 24 with high velocity and rotate the turbine wheel 23 at increasingly high speeds. The gases, after impinging the turbine wheel, escape to atmosphere, of course. As the waste gate is opened, a greater percentage of the exhaust gases escape through the duct 27, or are by-passed directly to atmosphere, reducing the operating speed of the turbine wheel. The position of the waste gate is thus seen to precisely control the speed of the turbine and since the latter operates the compressor 15, and the discharge pressure thereof varies in ratio to its speed, such control also varies the output pressure of the compressor, with equal precision.

The combination of the turbine structure 23, 24, 25 and the compressor 15 is commonly called the turbo-supercharger and is in extensive use, particularly in aircraft of various types.

The waste gate 28 is positioned, in the control apparatus forming the basis of the Sparrow application previously identified, by means of a reversible electric motor 29 which actuates a crank or crank arm 30 swingable in opposite directions in response to reversal of the motor. While the motor is at rest this crank arm 30 is locked against movement by a gear speed reduction means (not shown) arranged between the motor shaft and the arm, as will be readily apparent. The motor 29 is controlled by an electronic control system, which is here indicated generally at 31 and having output conductors 32 leading to the motor. The control system 31 responds to or is controlled by a manual pressure selector 33 and pressure sensing unit 34 connected by conductors 35 and 36 respectively to the system. The latter unit 34 communicates through a conduit 37 with the duct 16 and operates in response to variations in the pressure therein, from a value set by the manual selector control 33, to operate the waste gate motor 29 in one direction, or another, and adjust the waste gate 28 to increase or decrease the speed of compressor 15, according to whether the pressure in duct 16 decreases or increases, respectively, from the selected value. These operations are also described in detail in the Sparrow application hereinbefore referred to, and need not be detailed further herein for an understanding of my invention. It will be noted, however, that the waste gate 28 is positioned in either direction to satisfy the call of the control units 33 or 34 for changes in intake manifold pressures. Thus it may happen, due to either a sharp reduction in the intake manifold pressure, such as caused by a rapid ascent of the aircraft to a higher altitude and the resulting decrease of atmospheric pressure at the intake duct 14, or to a rapid advance of the manual control unit 33 to a higher pressure setting, that the waste gate will be moved toward closed position very rapidly in the effort to build up the induction system pressure. Such movement of the waste gate will cause the turbine and compressor to accelerate extremely rapidly and very likely will either cause the intake manifold pressure to overshoot the required value, resulting in a hunting condition in the control system, or will cause the back pressure in the exhaust system to build up to an excessive point, reducing the efficiency of the engine, or both.

To prevent these actions upon the too rapid closing of the waste gate, it has been the previous practice to provide a combination electromechanical inertia type accelerometer connected to the shaft 22 and responding to a sharp acceleration thereof to affect electrical conditions in the control system 31 to override the call thereof for closing movement of the gate. Such devices, while effective, are fairly complicated mechanically, and add to the complexity of the electrical system, so that added points of possible failure in operation are present.

It may be noted that a velocity control or governor 50 is also embodied, usually in connection with the accelerometer, for preventing overspeeding of the turbine and this control will be retained. Such control is operated from the turbine shaft and is connected by leads 50a to the control system 31 as disclosed in detail in the Sparrow application.

In accordance with my invention I provide a purely mechanical means of great simplicity by which over-acceleration of the turbine may be prevented under all conditions, and without any electrical connections whatever to the control system.

Referring to Figures 2 and 3, wherein only the waste gate 28 and related parts are shown, it will first be noted that the pivot pin 38 upon which the gate is supported for swinging movements in the duct 27, is located off center on the gate. That is, this pin 38, instead of being extended diametrically across the gate, which is similar in arrangement to the common butterfly valve and is, of course, substantially circular in shape in usual manner, is offset from a diametrical line by some distance. The waste gate is thus out of equipoise, or is unbalanced, and to one side of the pin 38 a comparatively greater area of the face of the gate is exposed to pressure of the exhaust gases. This side of greatest area is designated at 28$^a$, while the other side is indicated at 28$^b$.

The pin 38 is oscillated about its axis, for adjusting the waste gate 28, by a lever 39 secured at one end to an end of the pin extending exteriorly of the duct 27, and the other end of said lever is connected to the crank arm 30 of the waste gate motor by means of a link designated generally at 40. This link 40 embodies a strain release means which comprises a coil spring 41 anchored by end coils, at opposite ends, upon end caps or nuts 42—43. These caps are grooved at 44 to engage the end convolutions of the spring 41 and further are centrally bored and tapped at 45 to screw upon the threaded ends of two link rods 46—47. The other ends of said link rods 46—47 are respectively pivotally connected at 48—49 to the swingable ends of the motor crank arm 30 and the lever 39. The foregoing arrangement is obviously such that the effective length of link 40 may vary by expansion or contraction of the spring 41. The spring, however, holds the link rods 46—47 in alignment as shown. The spring 41 is preferably pretensioned so that when the convolutions are closed as shown in Figure 2, the spring is still under tension.

Operation

It will first be noted that the eccentricity of the pin 38 carrying the waste gate 28 is such that the greater pressure naturally exerted by the exhaust gases, against the side 28ª of greater area, will tend to swing or blow the gate open, or edgewise to the direction of flow of the gases through the duct 27. If the waste gate in fully closed position stands straight across the duct the pin may be offset to either side of a diametrical line across the gate, leaving aside the direction in which the arm 39 swings for the moment, and the pressure of the exhaust gases will swing the gate open. On the other hand, if the gate closes at an angle to the axis of the duct 27, then the side 28ª of the gate, of greatest face area, will naturally be the trailing or outwardly angled side, with respect to the direction of flow of the exhaust gases as will be understood.

When properly set up, the arm 39 will be arranged to swing in a direction such as to exert a compression force on the strain release spring 41 of link 40 when the waste gate is moved toward closed position. Thus opening movement of the waste gate will cause swinging movement of the arm 39 in the direction of expansion of the spring.

Having in mind these facts, it will be apparent that the spring 41 will normally yieldably resist the opening movement of the waste gate in response to the differential in exhaust gas pressures on opposite sides of the pivot axis of the gate. By properly pretensioning the spring, the existence at any instant of a pressure differential on the waste gate sufficient to overcome the resistance of the spring will result in the waste gate opening in response to such pressures, stretching the spring and in effect elongating the link 40 to permit such operation independently of the waste gate position selected by the waste gate motor. Thus should the waste gate be closed by the motor, or movement of crank arm 30 thereby, so sharply and to a degree such as to cause overacceleration of the turbine, overshooting and hunting of the control system, or the building up of excessive back pressures in the exhaust system, then the waste gate will be automatically and instantaneously swung toward open position independently of the control of the motor, to relieve these conditions. The initial tension of spring 41 will determine the point at which such relief will occur and, since the relief of the exhaust gas pressures has an immediate decelerating effect on the turbine, the arrangement will be seen to eliminate the necessity for an electro-mechanical or inertia type of accelerometer. The amount of relief which is provided can be varied by selection of a spring of the proper spring rate. The apparatus is further seen to be extremely simple in construction, capable of convenient application to the turbo-supercharger and instantaneous in action since it is responsive directly to exhaust gas pressures.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. Apparatus for controlling an exhaust gas driven turbine supercharger having valve means controlling the flow of exhaust gas through the turbine and tending upon an increase in the pressure differential across said valve means to move in a predetermined direction to decrease the flow of exhaust gas through the turbine, said apparatus comprising a reversible motor for positioning the valve means, means including a device adapted to respond to a pressure condition related to the pressure of the air supplied by the supercharger for controlling said motor to vary the position of said valve means to maintain said condition at a desired value, and means tending to prevent excessive speed of the turbine, said means consisting of a resilient connection for connecting said motor to the valve means, said resilient connection being initially stressed such that the same acts as a rigid link between the motor and valve means when the pressure differential does not exceed a predetermined value so that the valve means is positioned entirely by said motor, said resilient connection being resiliently yieldable in a direction to allow the valve means to move in said predetermined direction independently of said motor whenever the pressure differential across the valve means exceeds said predetermined value.

2. In combination with an exhaust gas driven turbine, valve means controlling the flow of exhaust gas through the turbine and tending upon an increase in the pressure differential thereacross to move in a predetermined direction to decrease the flow of exhaust gas through the turbine, means for positioning said valve means, and means tending to prevent excessive speed of the turbine, said means consisting of a resilient connection between said positioning means and the valve means, said resilient connection being initially stressed such that the same acts as a rigid linke between said positioning means and valve means when the pressure differential does not exceed a predetermined value so that the valve means is positioned entirely by said positioning means, said resilient connection being resiliently yieldable in a direction to allow the valve means to move in said predetermined direction independently of said positioning means whenever the pressure differential across the valve means exceeds said predetermined value.

3. In combination with an exhaust gas driven turbine, valve means controlling the flow of exhaust gas through the turbine and tending upon an increase in the pressure differential thereacross to move in a predetermined direction to decrease the flow of exhaust gas through the turbine, means for positioning said valve means, and means tending to prevent excessive speed of the turbine, said means consisting of a resilient connection between said positioning means and the valve means, said resilient connection including an expandable coil spring having a substantial initial tension when the turns of the coil are in engagement so that the same acts as a rigid link between said positioning means and valve means when the pressure differential does not exceed a predetermined value so that the valve means is positioned entirely by said positioning means, said resilient connection being resiliently expandable in a direction to allow the valve means to move in said predetermined direction independently of said positioning means whenever the pressure differential across the valve means exceeds said predetermined value.

ROBERT J. KUTZLER.

REFERENCES CITED

The following references are of record in the file of this patent:

UNITED STATES PATENTS

| Number | Name | Date |
| --- | --- | --- |
| 1,310,683 | Sherbondy | July 22, 1919 |
| 1,346,563 | Sherbondy | July 13, 1920 |
| 1,346,564 | Sherbondy | July 13, 1920 |
| 1,506,588 | Hurst | Aug. 26, 1924 |
| 1,557,793 | Berger et al. | Oct. 20, 1925 |
| 1,658,965 | Bradshaw | Feb. 14, 1928 |
| 1,924,377 | Pontow | Aug. 29, 1933 |
| 1,934,633 | Taylor | Nov. 7, 1933 |
| 2,148,230 | Berger | Feb. 21, 1939 |
| 2,199,259 | Hersey | Apr. 30, 1940 |
| 2,242,832 | Mennesson | May 20, 1941 |
| 2,247,151 | Clarke | June 24, 1941 |
| 2,255,324 | McGill | Sept. 9, 1941 |
| 2,306,625 | Hazen | Dec. 29, 1942 |
| 2,428,708 | Heftler | Oct. 7, 1947 |

FOREIGN PATENTS

| Number | Country | Date |
| --- | --- | --- |
| 249,756 | Germany | 1911 |
| 431,293 | Great Britain | 1935 |